United States Patent [19]

Muramoto et al.

[11] Patent Number: 4,908,468
[45] Date of Patent: Mar. 13, 1990

[54] AMPHIPHATIC POLYMERIZABLE VINYL MONOMERS, VINYL RESIN PARTICLES DERIVED FROM SAID MONOMERS AND PREPARATION THEREOF

[75] Inventors: Hisaichi Muramoto, Osaka; Koichi Saito, Kyoto; Keizou Ishii, Hyogo, all of Japan

[73] Assignee: Nippon Paint Co., Ltd., Osaka, Japan

[21] Appl. No.: 126,965

[22] Filed: Nov. 30, 1987

[30] Foreign Application Priority Data

Nov. 28, 1986 [JP] Japan ................................ 61-285708
Nov. 28, 1986 [JP] Japan ................................ 61-285709

[51] Int. Cl.$^4$ ......................................... C07C 143/525
[52] U.S. Cl. .................................... 560/14; 560/127; 560/151; 560/90
[58] Field of Search ................. 526/320; 560/199, 14, 560/90, 127, 151

[56] References Cited

U.S. PATENT DOCUMENTS 4,108,666  8/1978  Hayashi et al. ........................ 560/199

FOREIGN PATENT DOCUMENTS 588784   12/1959  Canada ................................ 560/199
0104491  4/1984  European Pat. Off. ............ 560/199
1138540  10/1962 Fed. Rep. of Germany ...... 560/199
4633015  9/1971  Japan ................................... 560/199
62-161742 7/1987 Japan .
62-161808 7/1987 Japan .

Primary Examiner—Joseph L. Schofer
Assistant Examiner—N. Sarofim
Attorney, Agent, or Firm—Wenderoth, Lind & Ponack

[57] ABSTRACT

A novel amphiphatic polymerizable vinyl monomer of the formula:

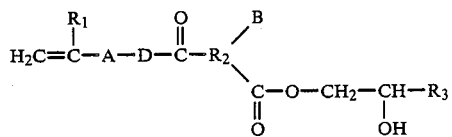

having surface active function and crosslinking catalytic function, as well as increased amphiphatic nature. The invention also provides a preparation method of said amphiphatic polymerizable vinyl monomer, resin particles obtained by using said vinyl monomer, aqueous and organic solvent dispersion of said resin particles which are specifically useful in coating compositions.

4 Claims, No Drawings

AMPHIPHATIC POLYMERIZABLE VINYL MONOMERS, VINYL RESIN PARTICLES DERIVED FROM SAID MONOMERS AND PREPARATION THEREOF

FIELD OF THE INVENTION

The present invention relates to novel amphiphatic polymerizable vinyl monomers which are useful in the preparation of organic high molecular weight compounds, novel amphiphatic vinyl resin particles derived from said monomers, and aqueous or organic solvent dispersions of said vinyl resin particles. The invention also concerns methods for the preparation of such monomers and of such resin particles.

BACKGROUND OF THE INVENTION

An end carboxyl bearing reactive vinyl monomer exemplified by acrylic acid, methacrylic acid and the like has been well known as a constituting unit of an acrylic resin. Such monomer is usually copolymerized with other acrylic monomers as acrylates, methacrylates and the like to improve the adhesion properties of the resulting resin to a metal substrate or to improve the curing properties of the resin to be compounded with an aminoplast resin.

However, in the heretofore proposed end carboxyl bearing vinyl monomers, the chain length between the vinyl group and the carboxyl group is relatively short and therefore, even when incorporated into a vinyl resin, the curing acceleration effect is not so good and the adhesion improvement is rather poor. Thus, the actual use of these monomers has been limited in certain cases.

Therefore, there is a strong demand for a novel class of end carboxyl bearing reactive vinyl monomers, which will exert, when incorporated into a vinyl resin, a strong catalytic action in a crosslinking reaction of the resulting resin with an aminoplast resin, and capable of improving the adhesion properties of the vinyl resin to metal substrates. In answer to these demands, the inventors have previously proposed a novel class of end carboxyl bearing reactive vinyl monomers of the formula:

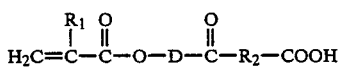

wherein $R_1$ is hydrogen or methyl group; $R_2$ is a substituted or unsubstituted aliphatic hydrocarbon having 2 to 10 carbon atoms, an alicyclic hydrocarbon having 6 to 7 carbon atoms or an aromatic hydrocarbon having 6 carbon atoms; D is a repeating unit of

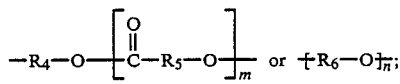

$R_4$ is ethylene or propylene; $R_5$ is a substituted or unsubstituted alkylene having 2 to 7 carbon atoms; $R_6$ is a substituted or unsubstituted alkylene having 2 to 5 carbon atoms; m is an integer of 1 to 10 and n is an integer of 2 to 50. (Japanese Patent Application No. 1899/86, publicly opened as 161742/87 on July 17, 1987).

In these kinds of reactive vinyl monomers, since a long chain of alkylene group is present between the reactive vinyl group and the end carboxyl group, said monomer can provide, when incorporated into a resin, a highly active carboxyl group at the end portion of pendant group of the resin and such carboyl group can afford a strong catalytic action in the crosslinking of the resin with an aminoplast resin.

Thus, the crosslinking rate is greatly improved and a highly gellated coating can be obtained.

Furthermore, in that monomer, there is included both a hydrophilic portion represented by the end carboxyl group and a hydrophobic portion represented by the alkylene chains of $R_2$ and D and the ratio of these portions may be freely controlled as desired. The presence of such hydrophilic and hydrophobic portions in the same structure of the monomer compound will exert a strong surface activation power.

Therefore, when the reactive vinyl monomer is used in a neutralized and solubilized form, an emulsion or dispersion polymerization of $\alpha, \beta$-ethylenically unsaturated compounds can be effected without using an external emulsifier, thereby obtaining a resinous emulsion capable of resulting in a coating with excellent water resistance and other desired properties.

However, in the actual coatings technology, an appropriate amount of various organic solvents including cellosolves, such as ethyl cellosolve, butyl cellosolve and the like, alcohols, such as ethanol, isopropanol, butanol and the like, esters, such as ethyl acetate, butyl acetate and the like, aliphatic hydrocarbons, such as hexane, heptane and the like, and aromatic hydrocarbons, such as benzene, toluene, xylene and the like are often added to a coating composition based on such resinous emulsion, for the object of controlling the solvent evaporation rate or in the composition's viscosity.

At that time, the resin particles contained therein should be still maintained in a stabilized form of a dispersion, otherwise the coating appearance will be adversely affected therewith. Recently, various attempts have been made to first prepare vinyl resin emulsion through an emulsion polymerization and then replace water with an organic solvent to obtain an organic solvent dispersion of vinyl resin particles, which is to be used in a solvent type coating composition.

Therefore, the resin particles thus formed should be well adapted both in respect to the aqueous coating composition and in the solvent type coating composition.

The aforesaid reactive vinyl monomers of Japanese Patent Application No. 1899/86 (Kokai No. 161742/87) are indeed excellent in both respect to the catalytic action in the crosslinking of a vinyl resin with an aminoplast resin and in the interfacial activity required for an emulsifier, but are not sufficient in respect to amphiphatic properties and especially hydrophobic properties which is believed to be essential in the aforementioned latest demands.

One promising clue for the improvement in clarity, and water resistance of a coating made of a resinous emulsion and film-forming property thereof is to control the resin particle diameter in the emulsion at will and to provide as fine particles as possible. To this end, it is highly desirable to increase the hydrophobic nature of the said reactive vinyl monomer to be used as an internal emulsifier, without destroying the good balance of hydrophilic and hydrophobic properties thereof, thereby improving the solubility towards oily substances as polymerization monomers and the like and having a stable dispersion of the finest particles of polymerization monomers in an aqueous medium.

It is, therefore, an object of the invention to provide a reactive vinyl monomer having not only the desired properties of an internal emulsifier and a crosslinking catalyst, but also the characteristic features of increased amphiphatic properties and especially improved solubility towards oily substances as polymerization monomers and organic solvents, which is specifically useful in an emulsion polymerization of α, β-ethylenically unsaturated compounds without using any external emulsifiers to give a stable dispersion of fine vinyl resin particles.

An additional object of the invention is to provide an economically advantageous method for the preparation of such vinyl monomers.

Other objects of the invention are to provide vinyl resin particles from said reactive vinyl monomers, which are applicable to both aqueous paint and solvent type coating compositions, to provide an economically advantageous method for the preparation of said resin particles, and to provide a stable aqueous or organic solvent dispersion of such resin particles, which is specifically useful in various technical fields including paint, ink and plastic industies.

SUMMARY OF THE INVENTION

According to the invention, the aforesaid objects can be attained with an amphiphatic, polymerizable vinyl monomer represented by the formula:

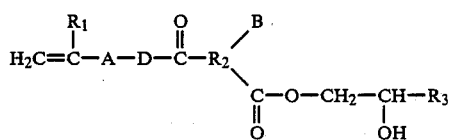

wherein $R_1$ is hydrogen or methyl group; $R_2$ is a substituted or unsubstituted aliphatic hydrocarbon having 5 to 10 carbon atoms, an alicyclic hydrocarbon having 6 to 7 carbon atoms or an aromatic hydrocarbon having 6 to 13 carbon atoms; $R_3$ is a hydrocarbon residue selected from aliphatic hydrocarbons having 1 to 30 carbon atoms, alicyclic hydrocarbons having 6 to 10 carbon atoms, aromatic hydrocarbons having 6 to 13 carbon atoms or their substituted derivatives or a hydrocarbon residue selected from aliphatic hydrocarbons having 1 to 30 carbon atoms, alicyclic hydrocarbons having 6 to 10 carbon atoms, aromatic hydrocarbons having 6 to 13 carbon atoms or their substituted derivatives, containing in its main chain at least one group selected from a vinyl group, an allyl group, an ether group, an ester group and a carbonyl group; A represents

group, in which k and l each is 0 or 1; D is a repeating unit of

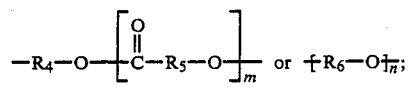

$R_4$ is ethylene or propylene; $R_5$ is a substituted or unsubstituted alkylene having 2 to 7 carbon atoms; $R_6$ is a substituted or unsubstituted alkylene having 2 to 5 carbon atoms; m and n each represents an average number of the respective repeating unit and m is an integer of 1 to 10 and n is an integer of 2 to 50; and B is —COOH or —SO₃H, and with an amphiphatic vinyl resin particles prepared by using the abovesaid monomer as an internal emulsifier through an emulsion polymerization, the vinyl resin particles characterized by bearing the pendant groups of the formula:

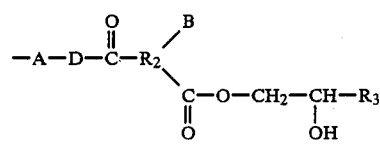

whose crosslinking degree is 2 mmol/g and less, average grain diameter is 100 to 100,000 Å and specific gravity is 0.9 to 1.3, wherein $R_2$ is a substituted or unsubstituted aliphatic hydrocarbon having 5 to 10 carbon atoms, an alicyclic hydrocarbon having 6 to 7 carbon atoms or an aromatic hydrocarbon having 6 to 13 carbon atoms; $R_3$ is a hydrocarbon residue selected from aliphatic hydrocarbons having 1 to 30 carbon atoms, alicyclic hydrocarbons having 6 to 10 carbon atoms, aromatic hydrocarbons having 6 to 13 carbon atoms or their substituted derivatives or a hydrocarbon residue selected from aliphatic hydrocarbons having 1 to 30 carbon atoms, alicyclic hydrocarbons having 6 to 10 carbon atoms, aromatic hydrocarbons having 6 to 13 carbon atoms or their substituted derivatives, containing in its main chain at least one group selected from a vinyl group, an allyl group, an ether group, an ester group and a carbonyl group; A represents

group, in which k and l each is 0 or 1; D is a repeating unit of

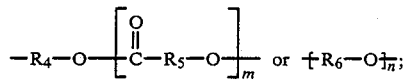

$R_4$ is ethylene or propylene; $R_5$ is a substituted or unsubstituted alkylene having 2 to 7 carbon atoms; $R_6$ is a substituted or unsubstituted alkylene having 2 to 5 carbon atoms; m and n each represents an average number of the respective repeating unit and m is an integer of 1 to 10 and n is an integer of 2 to 50; and B is —COOH or —SO₃H.

Preferred embodiments of the invention

The present amphiphatic polymerizable vinyl monomer of the aforesaid formula (I) may be advantageously prepared by the present method of reacting an end hydroxyl bearing acrylate or methacrylate of the formula:

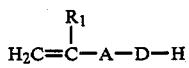 (II)

in which $R_1$ is hydrogen or a methyl group; A represents

in which k and l each is 0 or 1; D is a repeating unit of

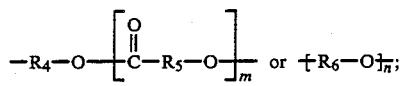

$R_4$ is ethylene or propylene; $R_5$ is a substituted or unsubstituted alkylene having 2 to 7 carbon atoms; $R_6$ is a substituted or unsubstituted alkylene having 2 to 5 carbon atoms; m and n each represents an average number of the respective repeating unit and m is an integer of 1 to 10 and n is an integer of 2 to 50, with an acid anhydride of the formula:

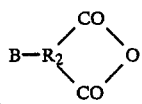 (III)

in which $R_2$ is a substituted or unsubstituted aliphatic hydrocarbon having 5 to 10 carbon atoms, alicyclic hydrocarbon having 6 to 7 carbon atoms or aromatic hydrocarbon having 6 to 13 carbon atoms; and B is —COOH or —SO$_3$H, to obtain a compound represented by the formula:

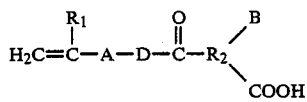 (IV)

in which $R_1$, A, D, $R_2$ and B are as defined above, and reacting thus obtained compound (IV) with an epoxy compound of the formula:

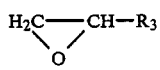 (V)

in which $R_3$ is a hydrocarbon residue selected from aliphatic hydrocarbons having 1 to 30 carbon atoms, alicyclic hydrocarbons having 6 to 10 carbon atoms, aromatic hydrocarbons having 6 to 13 carbon atoms or their substituted derivatives or a hydrocarbon residue selected from aliphatic hydrocarbons having 1 to 30 carbon atoms, alicyclic hydrocarbons having 6 to 10 carbon atoms, aromatic hydrocarbons having 6 to 13 carbon atoms or their substituted derivatives containing in its main chain at least one group selected from a vinyl group, an allyl group, an ether group, an ester group and a carbonyl group. Among the compounds (II), examples of the members having —COO— group as A are addition products of end hydroxyl bearing acrylates or methacrylates as hydroxyethyl acrylate, hydroxyethyl methacrylate, hydroxypropyl acrylate and hydroxypropyl methacrylate with cyclic esters as $\beta$-propiolactone, $\delta$-valerolactone, $\delta$-caprolactone, $\epsilon$-caprolactone or the like, and addition products of acrylic acid or methacrylic acid with cyclic ethers as ethylene oxide, propylene oxide, tetrahydrofuran and the like.

Various such products are commercially available as, for example, Placcel FA-1 (1:1 addition product of hydroxyethyl acrylate and $\epsilon$-caprolactone), Placcel FM-1 (1:1 addition product of hydroxyethyl methacrylate and $\epsilon$-caprolactone), Placcel FA-3 (1:3 addition product of hydroxyethyl acrylate and $\epsilon$-caprolactone), placcel FM-3 (1:3 addition product of hydroxyethyl methacrylate and $\epsilon$-caprolactone), Placcel FA-5 (1:5 addition product of hydroxyethyl acrylate and and $\epsilon$-caprolactone), Placcel FM-5 (1:5 addition product of hydroxyethyl methacrylate and $\epsilon$-caprolactone) (trademarks of Daicel Chem. Co.); Blenmer PE (addition product of methacrylic acid and ethyleneoxide), Blenmer PP (addition product of methacrylic acid and propyleneoxide) (trademarks of Nippon Yushi) and the like. Other similar products may easily be prepared as desired.

Examples of the compounds (II) having

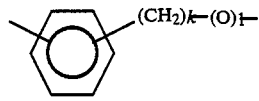

group as substituent A are styryl type polyethyleneoxide macromonomers prepared by living polymerization of ethylene oxides by vinyl benzyl oxide ions, styryl type polytetrahydrofuran macromonomers prepared by the combination of steps of preparing a living polytetrahydrofuran by the ring opening polymerization of tetrahydrofuran, and effecting end capping with vinyl phenoxide or vinyl benzyl oxide and the like. The preparation details are described in "Macromer synthesis and Polymerization" reported by Ryuzo Asami, Polymer processing Vol. 34, Sept., page 439 (1985). As the acid anhydrides of the formula (III), preference is given to such tribasic acid anhydrides as trimellitic anhydride, methyl cyclohexene tricarboxylic anhydride, naphthalene tricarboxylic anhydride, pentane $\alpha,\beta,\epsilon$-tricarboxylic anhydride, benzophenone tricarboxylic anhydride and substituted derivatives thereof.

Sulfophthalic anhydride and its substituted derivatives are also appropriate.

Though the reaction of said end hydroxyl bearing acrylate or methacrylate (II) and acid anhydride (III) may be easily carried out under heating and stirring conditions, it is preferred to effect the reaction in the presence of radical polymerization inhibitor as, for example, hydroquinone monomethyl ether for the protection of the end vinyl group. Usually, such radical polymerization inhibitor is used in a concentration of 5000 ppm or less, and more preferably 500 ppm or less.

The weight ratio of said hydroxyl bearing acrylate or methacrylate to acid anhydride is generally set in a range of 9:10 to 11:10.

Thus obtained compound (IV) is then reacted with a monoepoxy compound of the formula (V).

Examples of said monoepoxy compounds are glycidyl ester of versatic acid, n-butyl glycidyl ether, allyl glycidyl ether, glycidyl-p-t-butyl benzoate, glycidyl methacrylate, AOE-X 68 (trademark, α-olefin oxide, manufactured by Daicel Chem. Co.), Blenmer DFA (trademark of Nippon Yushi), SA-13 G (trademark of Idemitsu Sekiyu), and substituted derivatives thereof.

In this second step of reaction, the reaction may be easily proceeded by applying heat and stirring the reaction mixture, however, it is preferred to carry out the reaction in the presence of radical polymerization inhibitor as stated hereinbefore in connection with the first step of reaction. By the adoption of said reactions, the present amphiphatic polymerizable vinyl monomers of the formula (I)

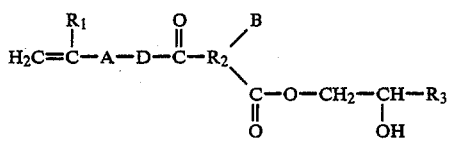

wherein $R_1$, A, D, $R_2$, B and $R_3$ are as defined hereinbefore, can be advantageously produced.

When compared the same with the reactive vinyl monomer of the formula:

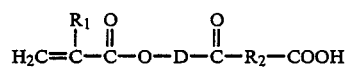

proposed in Japanese Patent Application No. 1899/86 ( Kokai No. 161742/87), it would be clear that the characteristic group of

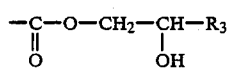

is further added to said reactive vinyl monomer. This means that the characteristic properties possessed by the previously proposed reactive vinyl monomer are maintained in the present vinyl monomer as they are and that an additional hydrophilic group of OH and additional hydrophobic portion represented by $R_3$ are incorporated into the monomer structure, anew.

For this reason, the hydrophobic nature of the vinyl monomer is markedly increased, while maintaining the good balance of hydrophilic and hydrophobic properties thereof.

Thus, in the present invention, a novel class of amphiphatic polymerizable vinyl monomers and its economically advantageous preparation method are herein proposed.

In another aspects of the invention, are provided a method for preparing amphiphatic vinyl resin particles bearing pendant groups of the formula:

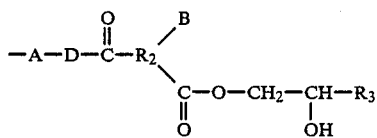

whose crosslinking degree is 2 m mol/g and less, average grain diameter is 100 to 100,000 Å and specific gravity is 0.9 to 1.3, comprising polymerizing a monomer mixture of 3 to 50% by weight of the total monomers of the present amphiphatic polymerizable vinyl monomer (I) and 97 to 50% by weight of at least one other copolymerizable α,β-ethylenically unsaturated monomers, in an aqueous medium through an emulsion polymerization and subsequently removing the water therefrom, amphiphatic vinyl resin particles themselves, and an aqueous or organic solvent, stable dispersion of such resin particles.

As the other copolymerizable, α,β-ethylenically unsaturated monomers, any of the α,β-ethylenically unsaturated compounds customarily used for the preparation of vinyl resins may be satisfactorily used, which are classified as follows:

Monomers having one α,β-ethylenically unsaturated bond:

(1) carboxyl bearing monomers: as, for example, acrylic acid, methacrylic acid, crotonic acid, itaconic acid, maleic acid, fumaric acid and the like (2) hydroxyl bearing monomers: as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol and methallyl alcohol (3) nitrogen containing alkyl acrylates or methacrylates: as, for example, dimethylaminoethyl acrylate, dimethylaminoethyl methacrylate and the like (4) polymerizable amides: as, for example, acrylic amide and methacrylic amide (5) polymerizable nitriles: as, for example, acrylonitrile and methacrylonitrile (6) alkyl acrylates or methacrylates: as, for example, methyl acrylate, methyl methacrylate, ethyl acrylate, n-butyl acrylate, n-butyl methacrylate and 2-ethylhexyl acrylate (7) polymerizable aromatic compounds: as, for example, styrene, α-methyl styrene, vinyl toluene and t-butyl styrene (8) α-olefines: as, for example, ethylene and propylene, (9) vinyl compounds as, for example, vinyl acetate and vinyl propionate Monomers having 2 and more α,β-ethylenically unsaturated bonds:

(10) diene compounds: as, for example, butadiene, isoprene and the like

(11) polymerizable unsaturated monocarboxylic acid esters of polyhydric alcohol; polymerizable unsaturated alcohol esters of polycarboxylic acid

(12) aromatic compound having 2 or more vinyl groups: as, for example, ethyleneglycol acrylate, ethyleneglycol methacrylate, triethyleneglycol dimethacrylate, tetraethyleneglycol dimethacrylate, 1,3-butyleneglycol dimethacrylate, trimethylolpropane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxymethylethane diacrylate, 1,1,1-trishydroxymethylethane triacrylate, 1,1,1-trishydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl isocyanurate, triallyl trimellitate, diallyl terephthalate, diallyl phthalate, divinyl benzene and the like.

These monomers may be used each in singularly or in combination form of two or more.

When the aforesaid monomer having 2 and more $\alpha,\beta$-ethylenically unsaturated bonds (hereinafter called as crosslinking monomer) are used, the amount of said monomers should be limited up to 60% by weight of the other copolymerizable, $\alpha,\beta$-ethylenically unsaturated monomers, otherwise considerable difficulties would be encountered in the preparation of the vinyl resin particles of this invention.

If desired, reactive vinyl monomers having ammonium base or betaine structure may be satisfactorily used as a part of said other copolymerizable monomers. Examples are trimethyl ammonium ethyl acrylate, trimethyl ammonium ethyl methacrylate, triethyl ammonium propyl acrylamide, triethyl ammonium propyl methacrylamide, trimethyl ammonium p-phenylene acrylamide, trimethyl ammonium p-phenylene methacrylamide, N-(3-sulfopropyl)-N-methacryloxyethyl-N,N-dimethyl ammonium betaine, N-(3-sulfopropyl)-N-methacrylamidepropyl-N,N-dimethyl ammonium betaine, N-(3-phosphopropyl)-N-methacryloxyethyl-N,N-dimethyl ammonium betaine, vinyl-1-methyl pyridinium chloride, 1-(3-sulfopropyl)-2-vinyl pyridinium betaine and the like. Reactive vinyl monomers having triazine structure as, for example, vinyl triazine may likewise be appropriate. The polymerization is carried out in a conventional way. At that time, it is preferred to use a polymerization initiator as, for example, an organic peroxide (e.g. benzoyl peroxide, t-butyl peroxide, cumen hydroperoxide and the like), an organic azo compound ( e.g. azobiscyanovaleric acid , azobisisobutyronitrile, azobis (2,4-dimethyl) valeronitrile, azobis(2-amidinopropane) hydrochloride and the like), an inorganic water soluble radical initiator (e.g. potassium persulfate, ammonium persulfate, sodium persulfate, hydrogen peroxide and the like), a Redox type initiator or the like. A chain transfer agent as, for example, a mercaptan (e.g. ethyl mercaptan, butyl mercaptan, dodecyl mercaptan and the like), a halogenated carbon ( e.g. carbon tetrabromide, carbon tetrachloride and the like) may also be used as desired.

Since the present amphiphatic polymerizable vinyl monomer (I) has a strong interfacial activity, there is no need of using an external emulsifier or a surfactant in this polymerization. However, it is, of course, possible to use a minor amount of surfactant or emulsifier, if desired. The amounts of such external surfactant or emulsifier, if adopted, the polymerization initiator, the chain transfer agent and aqueous medium are any of those conventionally used and the polymerization technique is also conventional.

The thus obtained emulsion does not include any external emulsifier or surfactant, or even if such material is used, does include only a limited amount of such emulsifier or surfactant, and therefore, can provide a coating with excellent properties especially in respect to the water resistance thereof. Therefore, the present emulsion is very useful in an aqueous paint.

When the aqueous medium is removed from said emulsion by, for example, spray drying, flash evaporation, air drying, solvent replacement or the like, fine particles of a novel vinyl resin of the invention can be easily obtained. The amphiphatic vinyl resin particles thus obtained are characterized by having a specific gravity 0.9 to 1.3, a crosslinking degree 2 m mol/g and less, and an average grain diameter 100 to 100,000 Å.

At the time when the aqueous medium is removed from the emulsion, the present resin particles are obtained in somewhat aggregated state and however are easily separated into individual particles when added to water or an organic solvent, or subjected to a mechanical force.

In either medium of water or an organic solvent, they are maintained in a stabilized state of dispersion.

As for the organic solvent, any of the members customarily used in paint industries may be satisfactorily used.

Examples are aromatic hydrocarbons, such as benzene, toluene, xylene and the like; aliphatic hydrocarbons, such as hexane, heptane, decane and the like; alcohols, such as ethanol, isopropanol, n-butanol and the like; ethers, such as diethyl ether, tetrahydrofuran, 1,4-dioxane, butyl cellosolve and the like; esters, such as ethyl acetate, butyl acetate and the like; and amides, such as formamide, N,N-dimethyl formamide, N,N-dimethyl acetamide and the like. They are each used singularly or in combinations of 2 and more. When the organic solvents are for water replacement purposes, preference is given to an organic solvent which can form an azeotropic mixture with water.

The thus obtained vinyl resin particles of the invention are, as stated hereinbefore, characterized by having greatly improved amphiphatic properties and a very fine particle size as compared with those of heretofore proposed vinyl resin particles, and can be stably dispersed in either a medium of water or organic solvent and hence are very useful as resinous, fillers or the like in various technical fields including the paint, ink, plastic processing and other industries.

The invention shall be now more fully explained in the following examples. Unless otherwise being stated, all parts and percentages are by weight.

EXAMPLE 1

Into a 1 liter glass flask fitted with a stirrer, a Dimroth condenser, a thermometer and an air inlet tube, were placed 77 parts of trimellitic anhydride, 300 parts of Placcel FM-5 (5:1 mol addition product of $\epsilon$-caprolactone and 2-hydroxyethyl methacrylate, Daicel Chem. Co.) and 500 ppm of the total charge of hydroquinone monomethyl ether. While introducing air, the mixture was stirred at 165° C. (inner temperature) for 30 minutes. After completion of reaction, the resulted product was subjected to hot filtration and a small amount of unreacted materials were removed. Thus obtained intermediate product (A) had an acid value of 125 and was a semi-solid material at 25° C.

Next, 100 parts of Cardura E-10 (glycidyl versatate, trademark, Shell Chem. Co.) were added and while introducing air again, the mixture was reacted at 150° C. (inner temperature) for 40 minutes under stirring conditions. The reaction product had an acid value of 52 and viscosity of 400 cP at 25° C. The reaction rate determined from the acid value of the reaction product was 95%.

EXAMPLE 2

Into a similar reaction vessel as used in Example 1, were placed 84 parts of methylcyclohexane tricarboxylic anhydride, 160 parts of Blenmer PP-1000 (5.5:1 mol addition product of propylene oxide and methacrylic acid, Nippon Yushi) and 500 ppm of the total charge of hydroquinone monomethyl ether. While introducing air, the mixture was stirred at 175° C. (inner temperature) for 30 minutes. After completion of reaction, the resulted product was subjected to hot filtration and a small amount of unreacted materials were removed. Thus obtained intermediate product (B) had an acid value of 186 and was a semi-solid material at 25° C.

Next, 120 parts of SA-13G (Idemitsu Sekiyu Co.) were added and while introducing air, the mixture was reacted at 150° C. (inner temperature) for 40 minutes under stirring conditions. The reaction product had an acid value of 67 and viscosity (25° C.) of 300 cP. The reaction rate determined from the acid value of the reaction product was 94%.

EXAMPLE 3

Into a similar reaction vessel as used in Example 1, were placed 77 parts of trimellitic anhydride, 288 parts of Placcel FA-5 (5:1 mol addition product of ε-caprolactone and 2-hydroxyethyl acrylate, Daicel Chem. Co.) and 500 ppm of the total charge of hydroquinone monomethyl ether.

While introducing air, the mixture was stirred at 165° C. (inner temperature) for 30 minutes. After completion of reaction, the resulted product was subjected to hot filtration and a small amount of unreacted materials were removed. Thus obtained intermediate product (C) had an acid value of 125 and was a semi-solid material at 25° C.

Next, 130 parts of Blenmer DFA (monoglycidyl ester of coconut oil fatty acid, Nippon Yushi Co.) were added and while introducing air again, the mixture was reacted at 150° C. (inner temperature) for 40 minutes under stirring conditions. The reaction product had an acid value of 47 and viscosity (25° C.) of 380 cP. The reaction rate determined from the acid value of the reaction product was 95%.

EXAMPLE 4

Into a similar reaction vessel as used in Example 1, were placed 92 parts of sulfophthalic anhydride (Kawasaki Kasei Co.), 388 parts of 10:1 mol addition product of tetrahydrofuran and methacrylic acid, and 500 ppm of the total charge of hydroquinone monomethyl ether.

While introducing air, the mixture was stirred at 170° C. (inner temperature) for 30 minutes. After completion of reaction, the resulted product was subjected to hot filtration and a small amount of unreacted materials were removed. Thus obtained intermediate product (D) had an acid value of 108 and was a semi-solid material at 25° C.

Next, 94 parts of glycidyl-p-t-butyl benzoate (Fuso Kagaku Co.) were added and while introducing air again, the mixture was reacted at 150° C. (inner temperature) for 40 minutes under stirring conditions. The reaction product had an acid value of 48 and viscosity (25° C.) of 350 cP. The reaction rate determined from the acid value of the reaction product was 90%.

EXAMPLE 5

Into a similar reaction vessel as used in Example 1, were placed 84 parts of methylcyclohexane tricarboxylic anhydride, 308 parts of 10:1 mol addition product of δ-valerolactone and 2-hydroxypropyl methacrylate and 500 ppm of the total charge of hydroquinone monomethyl ether.

While introducing air, the mixture was stirred at 175° C. (inner temperature) for 30 minutes. After completion of reaction, the resulted product was subjected to hot filtration and a small amount of unreacted materials were removed. Thus obtained intermediate product (E) had an acid value of 118 and was a semi-solid material at 25° C.

Next, 101 parts of AOE-X68 (α-olefin oxide, Daicel Chem. Co.) were added and while introducing air again, the mixture was reacted at 150° C. (inner temperature) for 30 minutes under stirring conditions. The reaction product had an acid value of 45 and viscosity (25° C.) of 270 cP. The reaction rate determined from the acid value of the reaction product was 94%.

EXAMPLE 6

The reactive monomers obtained in Examples 1 to 5 were neutralized respectively with dimethyl ethanolamine and 100% neutralization solutions were prepared.

Each solution was taken into two test tubes and one was diluted with water and the other with 9:1 mixed solvent of xylene and n-butanol, and these diluted solutions were visually examined to evaluate solubilities.

For comparison sake, the similar 100% neutralization solutions were prepared with the intermediate products A to E (which are the reactive monomers disclosed in Japanese Patent Application Kokai No. 1900/86) and similar solubility tests were conducted therewith. The test results are shown in Table 1.

TABLE 1

| Solubility test results | | | | | |
|---|---|---|---|---|---|
| Example No. | 1 | 2 | 3 | 4 | 5 |
| water xylene/n-butanol 9:1 (weight ratio) | | | | | |
| Comp. Experiment | A | B | C | D | E |
| water xylene/n-butanol 9:1 (weight ratio) | X | X | X | X | X |

(Note)
L501 easily soluble
X insoluble or almost insoluble

Example 7

Into a similar reaction vessel as used in Example 1, were placed 200 parts of δ-methylpentane-α,γ,δ-tricarboxylic anhydride, 256 parts of Placcel FM-1 (1:1 mol addition product of ε-caprolactone and 2-hydroxyethyl methacrylate, Daicel Chem. Co.) and 500 ppm of the total charge of hydroquinone monomethyl ether.

While introducing air, the mixture was stirred at 150° C. (inner temperature) for 60 minutes. After completion of reaction, the resulted intermediate product had an acid value of 248.

Next, 342 parts of AOE-Y08 (α-olefin oxide, trademark of Daicel Chem. Co.) were added and while introducing air again, the mixture was reacted at 150° C. (inner temperature) for 40 minutes under stirring conditions. The reaction product had an acid value of 73 and the reaction rate was 97%.

EXAMPLE 8

Into a similar reaction vessel as used in Example 1, were placed 296 parts of benzophenon-2,3',4,4'-tricarboxylic acid-3',4'-anhydride, 460 parts of Blenmer PE-350 (8:1 mol addition product of ethylene oxide and methacrylic acid, Nippon Yushi), 84 parts of butylacetate and 500 ppm (of the total charged) of hydroquinone monomethyl ether.

While introducing air, the mixture was stirred at 150° C. (inner temperature) for 60 minutes. After completion of reaction, under reduced pressure (<10 mmHg, 50° C.), butylacetate was distilled off to obtain an intermediate product having a solid content of 98% and an acid value of 146.

Next, 130 parts of n-butyl glycidyl ether were added and while introducing air again, the mixture was reacted at 150° C. (inner temperature) for 40 minutes under stirring condition.

The reaction product had an acid value of 67 and the reaction rate was 95%.

EXAMPLE 9

Into a similar reaction vessel as used in Example 1, were placed 112 parts of $\beta,\beta$-dimethylpentane-$\alpha,\beta,\delta$-tricarboxylic acid anhydride, 705 parts of 30:1 mol addition product of ethylene oxide and methacrylic acid, and 500 ppm (of the total charged) of hydroquinone monomethyl ether. While introducing air, the mixture was stirred at 150° C. (inner temperature) for 60 minutes. After completion of reaction, the resultant intermediate product had an acid value of 70.

Next, 57 parts of allyl glycidyl ether were added and while introducing air again, the mixture was reacted at 150° C. (inner temperature) for 40 minutes under stirring condition. The reaction product had an acid value of 35 and the reaction rate was 96%.

EXAMPLE 10

Into a similar reaction vessel as used in Example 1, were placed 128 parts of naphthalene-1,4,5-tricarboxylic acid-4,5-anhydride, 448 parts of p-vinylbenzyloxy poly (tetrahydrofuran)* (10 mol addition product of tetrahydrofuran), 64 parts of butylacetate and 500 ppm (of the total charged) of hydroquinone monomethyl ether. While introducing air, the mixture was stirred at 150° C. (inner temperature) for 60 minutes. After completion of reaction, under reduced pressure (<10 mmHg, 50° C.), butylacetate was distilled off to obtain an intermediate product having a solid content of 98% and an acid value of 97.

*... p-vinylbenzyloxy poly (tetrahydrofuran) was prepared by making reference to the following reference: R. Asami, M. Takaki, K. Kita, E. Asakura, Polym. Bull., 2, 713 (1980).

Next, 75 parts of phenylglycidyl ether were added and while introducing air again, the mixture was reacted at 150° C. (inner temperature) for 40 minutes under stirring condition. The reaction product had an acid value of 45 and the reaction rate was 96%.

EXAMPLE 11

Into a 1 liter glass flask fitted with a stirrer, a Dimroth condenser, a thermometer and a nitrogen gas inlet tube, were placed 280 parts of deionized water. To this, were dropwise added a mixture of 13 parts of the reactive monomer obtained in Example 1 and neutralized with dimethyl ethanolamine to obtain 100 % neutralization solution, 18 parts of methyl methacrylate, 18 parts of n-butyl acrylate, 16 parts of ethylenglycol dimethacrylate and 35 parts of styrene through the dropping funnel, at 80° C. (inner temperature) in 2 hours under stirring condition. At the same time, a solution of 1 part of 4,4'-azobis-4-cyanovaleric acid neutralized with an alkali in 20 parts of deionized water was dropwise added to effect an emulsion polymerization. Thus obtained product had a solid content of 25% by weight, a crosslinking rate of 0.8 m mol/g, a specific gravity (solid resin) of 1.12 and the mean diameter of the emulsion particles was 260 Å (measured by laser beam scattering method).

EXAMPLE 12

Into a similar reaction vessel as used in Example 11 were place 280 parts of deionized water. To this, were dropwise added a mixture of 25 parts of the reactive monomer obtained in Example 2 and neutralized with dimethyl ethanolamine to obtain 100 % neutralization solution, 16 parts of methyl methacrylate, 16 parts of n-butyl acrylate, 13 parts of NK ester NPG (neopentylglycol dimethacrylate, Shin Nakamura Kagaku Co.) and 35 parts of styrene through the dropping funnel, at 80° C. (inner temperature) in 2 hours under stirring condition. At the same time, a solution of 1 part of 4,4'-azobis-4-cyanovaleric acid neutralized with an alkali in 20 parts of deionized water was dropwise added to effect an emulsion polymerization. Thus obtained product had a solid content of 25% by weight, a crosslinking rate of 0.5 m mol/g, a specific gravity (solid resin) of 1.05 and the mean diameter of the emulsion particles was 180 Å (measured by laser beam scattering method).

EXAMPLE 13

Into a similar reaction vessel as used in Example 11, were placed 280 parts of deionized water. To this, were dropwise added a mixture of 16 parts of the reactive monomer obtained in Example 3 and neutralized with dimethyl ethanolamine to obtain 100% neutralization solution, 17 parts of methyl methacrylate, 17 parts of n-butyl acrylate, 16 parts of NK ester HD (1,6-hexane diol dimethacrylate, Shin Nakamura Kagaku Co.) and 34 parts of styrene through the dropping funnel, at 80° C. (inner temperature) in 2 hours under stirring condition. At the same time, a solution of 1 part of 4,4'-azobis-4-cyanovaleric acid neutralized with an alkali in 20 parts of deionized water was dropwise added to effect an emulsion polymerization. Thus obtained product had a solid content of 25% by weight, a crosslinking rate of 0.6 m mol/g, a specific gravity (solid resin) of 1.20 and the mean diameter of the emulsion particles was 350 Å (measured by laser beam scattering method).

EXAMPLE 14

Into a similar reaction vessel as used in Example 11, were placed 280 parts of deionized water. To this, were dropwise added a mixture of 16 parts of the reactive monomer obtained in Example 4 and neutralized with dimethyl ethanolamine to obtain 100% neutralization solution, 17 parts of methyl methacrylate, 34 parts of n-butyl acrylate, and 33 parts of styrene through the dropping funnel, at 80° C. (inner temperature) in 2 hours under stirring condition. At the same time, a solution of 1 part of 4,4'-azobis-4-cyanovaleric acid neutralized with an alkali in 20 parts of deionized water was dropwise added to effect an emulsion polymerization. Thus obtained product had a solid content of 25% by weight, a specific gravity (solid resin) of 1.08 and the mean diameter of the emulsion particles was 480 Å (measured by laser beam scattering method).

EXAMPLE 15

Into a similar reaction vessel as used in Example 11, were placed 280 parts of deionized water. To this, were dropwise added a mixture of 16 parts of the reactive monomer obtained in Example 5 and neutralized with dimethyl ethanolamine to obtain 100% neutralization solution, 17 parts of methyl methacrylate, 34 parts of n-butyl acrylate, and 33 parts of styrene through the dropping funnel, at 80° C. (inner temperature) in 2 hours under stirring condition. At the same time, a solution of 1 part of 4,4'-azobis-4-cyanovaleric acid neutralized with an alkali in 20 parts of deionized water was dropwise added to effect an emulsion polymerization. Thus obtained product had a solid content of 25% by weight, a specific gravity (solid resin) of 1.18 and the mean diameter of the emulsion particles was 430 Å (measured by laser beam scattering method).

COMPARATIVE EXAMPLE 1

Into a similar reaction vessel as used in Example 11, were placed 280 parts of deionized water. To this, were dropwise added a mixture of 13 parts of the reactive monomer obtained in Example 1 and neutralized with dimethyl ethanolamine to obtain 100% neutralization solution, 18 parts of methyl methacrylate, 18 parts of n-butyl acrylate, and 35 parts of styrene through the dropping funnel, at 80° C. (inner temperature) in 2 hours under stirring condition. At the same time, a solution of 1 part of 4,4'-azobis-4-cyanovaleric acid neutralized with an alkali in 20 parts of deionized water was dropwise added to effect an emulsion polymerization. Thus obtained product had a solid content of 25% by weight, and the mean diameter of the emulsion particles was 850 Å (measured by laser beam scattering method).

EXAMPLE 16

To each of the synthetic resin emulsions obtained in Examples 11 to 15 and Comparative Example 1, a certain amount of n-buthanol and xylene was added respectively (1:1 by weight mixture of water and n-buthanol and 9:1 by weight mixture of water and xylene respectively).

Then each mixture was visually examined to evaluate the exsistence of small granules of coagulation.

The test results are shown in Table 2.

Each of the synthetic resin emulsions obtained in Example 11 to 13 and Comparative Example 1 was dried overnight by means of the freezed-dry method and each of the resin solid was separated. The remaining water content in each of dried resin solids was determined by Karl Fischer method and found to be below 0.1%.

Furthermore, to each of said dried resin solid, 9:1 (weight ratio) mixture of xylene and n-buthanol was added to obtain a dispersion of 10:1 (weight ratio) mixture of said solvent and said resin solid.

Each dispersion was subjected to supersonic-treatment for an hour and then was visually examined to evaluate the dispersibility of said resin solid particles. The test results are show in Table 3.

TABLE 2

| Dispersibility of the particles in the medium of water/organic solvent mixture | | | | | | |
|---|---|---|---|---|---|---|
| Example | 11 | 12 | 13 | 14 | 15 | Comp. Ex. 1 |
| water/n-buthanol 1:1 (weight ratio) | | | | | | X |
| water/xylene | | | | | | X |

TABLE 2-continued

| Dispersibility of the particles in the medium of water/organic solvent mixture | | | | | | |
|---|---|---|---|---|---|---|
| Example | 11 | 12 | 13 | 14 | 15 | Comp. Ex. 1 |
| 9:1 (weight ratio) | | | | | | |

(Note)
 dispersible
X small granules of coagulation generated

TABLE 3

| Dispersibility of the particles in water or in organic solvents alone | | | | |
|---|---|---|---|---|
| Example | 11 | 12 | 13 | Comp. Ex. 1 |
| water | | | | |
| xylene/n-buthanol 9:1 (weight ratio) | | | | X |

(Note)
 dispersible
X coagulates generated

EXAMPLE 17

Incorporation of amino monomer

Into a similar reaction vessel as used in Example 11 were placed 280 parts of deionized water. To this, were dropwise added a mixture of 13 parts of the reactive monomer obtained in Example 1 and neutralized with dimethyl ethanolamine to obtain 100% neutralization solution, 1 part of N,N-dimethylaminopropyl methacrylamide (Texaco Chemical Co.), 20 parts of n-butyl acrylate, 46 parts of NK ester NPG (neopentylglycol dimethacrylate, Shin Nakamura Kagaku Co.) and 20 parts of styrene through the dropping funnel, at 80° C. (inner temperature) in 2 hours under stirring condition. At the same time, a solution of 1 part of 4,4'-azobis-4-cyanovaleric acid neutralized with an alkali in 20 parts of deionized water was dropwise added to effect an emulsion polymerization.

Thus obtained product had a solid content of 25% by weight, a crosslinking rate of 1.9 m mol/g, a specific gravity (solid resin) of 1.07 and the mean diameter of the emulsion particles was 450 Å (measured by laser beam scattering method).

EXAMPLE 18

Incorporation of betain monomer

Into a similar reaction vessel as used in Example 11 were placed 280 parts of deionized water. To this, were dropwise added a mixture of 16 parts of the reactive monomer obtained in Example 3 and neutralized with dimethyl ethanolamine to obtain 100% neutralization solution, 0.2 part of N-(3-sulfopropyl)-N-methacryloyl oxyethyl-N,N-dimethylammonium betaine (Rasching Co.), 17 parts of methylmethacrylate, 17 parts of n-butylacrylate, 15 parts of NK ester NPG (neopentylglycol dimethacrylate, Shin Nakamura Kagaku Co.) and 35 parts of styrene through the dropping funnel, at 80° C. (inner temperature) in 2 hours under stirring condition. At the same time, a solution of 1 part of 4,4'-azobis-4-cyanovaleric acid neutralized with an alkali in 20 parts of deionized water was dropwise added to effect an emulsion polymerization. Thus obtained product had a solid content of 25% by weight, a crosslinking rate of 0.6 m mol/g, a specific gravity (solid resin) of 1.10 and the mean diameter of the emulsion particles was 300 Å (measured by laser beam scattering method).

EXAMPLE 19

Into a similar reaction vessel as used in Example 1, were placed 128 parts of naphthalene-1,4,5-tricarboxylic acid-4,5-anhydride, 448 parts of vinylbenzyloxy poly (tetrahydrofuran)* (10 mol addition product of tetrahydrofuran), 64 parts of butylacetate and 500 ppm (of the total charged) of hydroquinone monomethyl ether. While introducing air, the mixture was reacted at 150° C. (inner temperature) for 60 minutes under stirring condition. After completion of reaction, butylacetate was distilled off under reduced pressure (<10 mmHg, 50° C.) to obtain an intermediate product having a solid content of 98% and an acid value of 97. Next, 75 parts of phenylglycidyl ether were added and while introducing air again, the mixture was reacted at 150° C. (inner temperature) for 40 minutes under stirring condition. The reaction product had an acid value of 45 and the reaction rate was 96%.

*... p-vinylbenzyloxy poly (tetrahydrofuran) was prepared by making reference to the following reference: R. Asami, M. Takaki, K. Kita, E. Asakura, Polymer. Bull., 2, 713 (1980).

EXAMPLE 20

Into a similar reaction vessel as used in Example 11 were placed 280 parts of deionized water. To this, were dropwise added a mixture of 16 parts of the reactive monomer obtained in Example 19 and neutralized with dimethyl ethanolamine to obtain 100% neutralization solution, 34 parts of methyl methacrylate, 16 parts of n-butyl acrylate, and 34 parts of styrene through the dropping funnel, at 80° C. (inner temperature) in 2 hours under stirring condition. At the same time, a solution of 1 part of 4,4'-aobis-4-cyanovaleric acid neutralized with an alkali in 20 parts of deionized water was dropwise added to effect an emulsion polymerization. Thus obtained product had a solid content of 25% by weight, a specific gravity (solid resin) of 1.09 and the mean diameter of the emulsion particles was 550 Å (measured by laser beam scattering method).

What is claimed is:

1. An amphiphatic, polymerizable vinyl monomer represented by the formula:

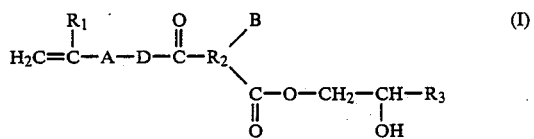

wherein $R_1$ is hydrogen or a methyl group; $R_2$ is a substituted or unsubstituted aliphatic hydrocarbon having 5 to 10 carbon atoms, an alicyclic hydrocarbon having 6 to 7 carbon atoms or an aromatic hydrocarbon having 6 to 13 carbon atoms; $R_3$ is a hydrocarbon residue selected from aliphatic hydrocarbons having 1 to 30 carbon atoms, alicyclic hydrocarbons having to 10 carbon atoms, aromatic hydrocarbons having 6 to 13 carbon atoms or their substituted derivatives or a hydrocarbon residue selected from aliphatic hydrocarbons having 1 to 30 carbon atoms, alicyclic hydrocarbons having 6 to 10 carbon atoms or their substituted derivatives, containing in its main chain at least one group selected from a vinyl group, an allyl group, an ether group, an ester group and a carbonyl group; A represents

group, in which k and l each is 0 or 1; D is a repeating unit of

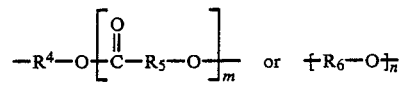

$R_4$ is ethylene or propylene; $R_5$ is a substituted or unsubstituted alkylene having 2 to 7 carbon atoms; $R_6$ is a substituted or unsubstituted alkylene having 2 to 5 carbon atoms; m and n each represents the average number of the respective repeating units wherein m is an integer of 1 to 10 and n is an integer of 2 to 50; and B is —COOH or —SO$_3$H.

2. A method for preparing an amphiphatic, polymerizable vinyl monomer represented by the formula (I):

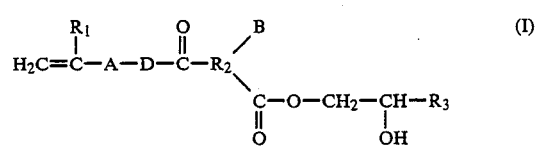

wherein $R_1$ is hydrogen or a methyl group; $R_2$ is a substituted or unsubstituted aliphatic hydrocarbon having 5 to 10 carbon atoms, an alicyclic hydrocarbon having 6 to 7 carbon atoms or an aromatic hydrocarbon having 6 to 13 carbon atoms; $R_3$ is a hydrocarbon residue selected from aliphatic hydrocarbons having 1 to 30 carbon atoms, alicyclic hydrocarbons having hydrocarbons having 6 to 13 carbon atoms or their substituted derivatives or a hydrocarbon residue selected from aliphatic hydrocarbons having 1 to 30 carbon atoms, alicyclic hydrocarbons having 6 to 10 carbon atoms, aromatic hydrocarbons having 6 to 13 carbon atoms or their substituted derivatives, containing in its main chain at least one group selected from a vinyl group, an allyl group, an ether group, an ester group and a carbonyl group; A represents

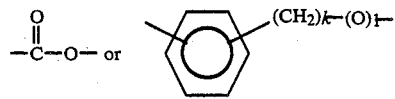

group, in which k and l each is 0 or 1; D is a repeating unit of

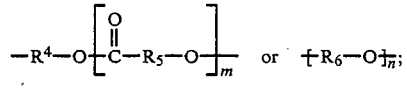

$R_4$ is ethylene or propylene; $R_5$ is a substituted or unsubstituted alkylene having 2 to 7 carbon atoms; $R_6$ is a substituted or unsubstituted alkylene having 2 to 5 carbon atoms; m and n each represents an average number of the respective repeating units, wherein m is an integer of 1 to 10 and n is an integer of 2 to 50; and B is —COOH or —SO$_3$H, comprising the combination of steps of reacting an end hydroxyl bearing acrylate or methacrylate of the formula:

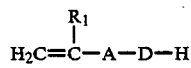  (II)

in which $R_1$, A and D are as defined above, with an acid anhydride of the formula:

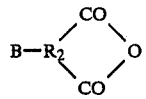  (III)

in which B and $R_2$ are as defined above, to obtain a compound represented by the formula:

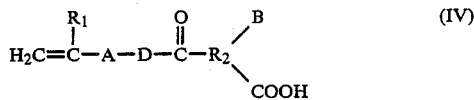  (IV)

and reacting the thus obtained compound (IV) with an epoxy compound of the formula:

  (V)

in which $R_3$ is as defined above.

3. A method according to claim 2, wherein the reaction of said (II) and (III) is carried out in the presence of a radical polymerization inhibitor.

4. A method according to claim 2, wherein the end hydroxyl bearing acrylate or methacrylate and the acid anhydride are reacted in a molar ratio of 9:10–11:10 and the reaction product thus obtained and the epoxy compound are reacted in a molar ratio of 9:10–11:10.

* * * * *